United States Patent [19]

Stark et al.

[11] Patent Number: 4,805,281
[45] Date of Patent: Feb. 21, 1989

[54] HYDRAULICALLY ACTUATED ASSEMBLY DEVICE

[75] Inventors: Josef Stark, Hambach; Willi Gossmann, Niederwerrn; Rupert Wurmback, Grettstadt, all of Fed. Rep. of Germany

[73] Assignee: SKF GmbH, Schweinfurt, Fed. Rep. of Germany

[21] Appl. No.: 20,507

[22] Filed: Mar. 3, 1987

[30] Foreign Application Priority Data

Mar. 8, 1986 [DE] Fed. Rep. of Germany ....... 3607655

[51] Int. Cl.⁴ .............................................. B23P 19/04
[52] U.S. Cl. ........................................ 29/252; 269/20
[58] Field of Search ...................... 33/533; 269/71, 73, 269/20, 25; 29/252, 434, 407

[56] References Cited

U.S. PATENT DOCUMENTS

| 4,504,048 | 3/1985 | Shiba et al. | 269/71 |
| 4,558,502 | 12/1985 | Grössmann et al. | 29/252 |
| 4,621,402 | 11/1986 | Gössmann et al. | 29/407 |

Primary Examiner—Frederick R. Schmidt
Assistant Examiner—Judy J. Hartman
Attorney, Agent, or Firm—Eugene E. Renz, Jr.

[57] ABSTRACT

A hydraulically actuated device for moving machine parts or the like, especially a device for pressing or fitting bearings into place in the forks of universal joints, consisting of a linear-action work cylinder, a pressure generator with a constant pressure, a supply tank with pressure medium, a main valve which controls the flow of pressure medium to provide the required amount in the work chamber of the work cylinder, a main line connecting these parts of the device, and a measurement system, which controls the main valve as a function of a measurement value, especially the center offset of the joint fork with respect to a reference axis or the like, characterized in that, between the work chamber of the work cylinder and the supply tank, a return line is provided, which has a throttle device which sharply reduces the return flow of pressure medium by comparison to the flow of medium into the work chamber.

5 Claims, 2 Drawing Sheets

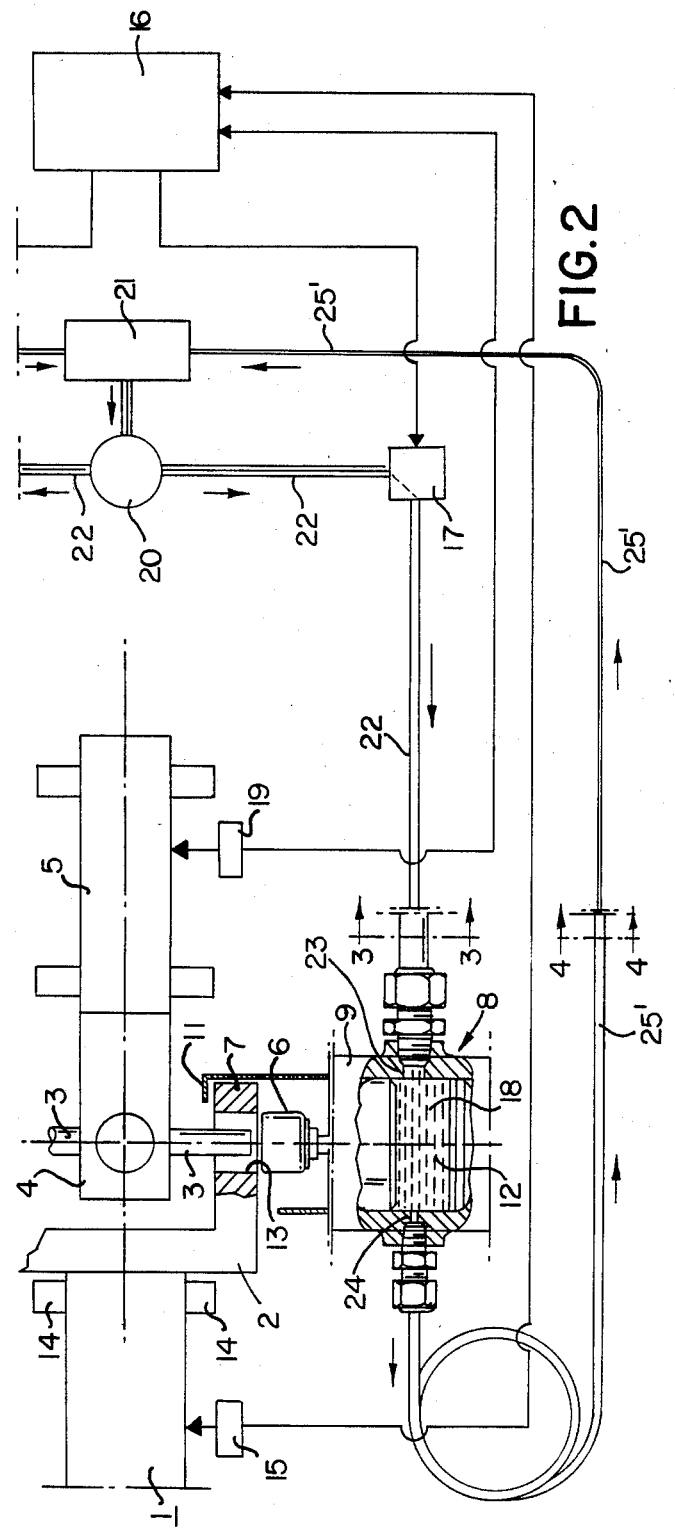
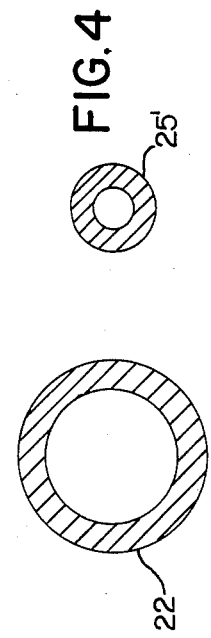
FIG.2
FIG.3
FIG.4

HYDRAULICALLY ACTUATED ASSEMBLY DEVICE

FIELD OF THE INVENTION

The present invention relates to assembly devices and more specifically to a hydraulically actuated assembly device particularly adapted for use in assembling the universal joint bearings in the fork of universal joints.

BACKGROUND OF THE INVENTION

Devices of this type are not new per se. For example, a typical prior art device is shown in West German Offenlegungsschrift No. 3,333,66. The assembly device shown in this patent serves to press or fit universal joint bearings into the bore of the universal joint. For this purpose, the joint cross is either separately introduced and held in position or it can already be a component of a universal joint shaft or the like. It has been found that during the assembly process, it is important to maintain the center offset of the joint parts relative to each other as small as possible. Center offsets are a problem which cannot be corrected after assembly of the parts. It has been found that different pressing forces resulting from production tolerances of the universal joint bearings and the bores or different cross sections and structural differences in the fork arms can cause the center offsets. The prior known device incorporates means for correction. However, it is noted that there are areas in which the assembly results can be improved even further.

In the prior known devices, the pressing and fitting of the universal joint bearings into place is carried out with a hydraulic work cylinder. The requisite pressure for actuating the cylinder is provided by a pressure generator and a valve which allows the required amount of pressure medium to flow into or out of the work chamber of the work cylinder as needed. The pressure generator provides a pressure which is always more than the required value. The value is controlled as a function of the measurement value obtained from the center offset described above and continually regulates during the pressing and/or fitting process, the amount of pressure medium present in the work chamber of the work cylinder. The high force required especially when the universal joint bearing is being fitted is available even at minimal travel of the piston or of the fitting ram attached to it. It has been found that when extremely short travels are reuired, particularly at the end of the assembly process, which are in the range of 0.1 to 0.01 mm, a more sensitive quantity control by the flow control valve can lead to even better results. It has been found that a particularly critical situation is encountered when, at the end of the fitting process in one of the joint forks, too much pressure medium is supplied by the valve to the work chamber, even if this excess is very small. A center offset caused in this way leads to isolated cases of assembly results which, even though the overall results are considered satisfactory are still outside the field of tolerances for the amount of center offset.

SUMMARY OF THE INVENTTION

With the foregoing in mind, an object of the present invention is to improve the presently known systems for fitting bearings in such a way that, during assembling, even smaller center off set values can be achieved and results outside the tolerance field can be eliminated. To this end, in accordance with the present invention, a return line is provided between the work chamber of the work cylinder and the supply tank of he displacement device having a throttling device therein which sharply reduces the flow of pressure medium returning in that line with respect to flow of pressure medium to the work chamber. This throttle valve in the return line, therefore, presents considerable resistance to the return flow of pressure medium. In this manner, a continuous circuit is created from the supply tank via the pressure generator, the main line and the main valve to the work chamber of the work cylinder and from there via the throttle valve and the return line back to the supply tank. Thus, the amount of pressure medium delivered is determined solely by the throttle valve. When the main valve is opened an appropriate amount and when the return flow determined by the throttle valve is sufficient to ensure a continuous supply of pressure medium to the work chamber, the circuit is completed. The opening of the main valve the required extent is an automatic process because the measurement system responds to the absence of pressure medium in the work chamber as to an apparent center offset and thus, attempts to open the main valve to equalize the condition. This equalization occurs promptly, since the pronounced throttling of the return flow makes it possible for the pressure medium to flow in an amount which far exceeds that of the return flow. The return flow is throttled by reason of the high delivery capacity and the high available pressure of the pressure generator. Under these conditions, therefore, the main valve operates not from a closed cut rather from a slightly open position thereby ensuring the necessary displacement of the piston or of the pressing/fitting tool. It is advantageous that the pulse-like pressure sures in the hydraulic system during opening or closing of the main valve, which would otherwise be unavoidable, do not occur. The overswing of the pressing motion in the direction of excessively high values caused by this and thus overcompensated center offsets are, therefore, completely prevented by the system of the present invention. From the already slightly open position of the main valve, this valve can then regulate the pressure medium with great sensitivity, allowing the flow of even the very small quantitites which may additionally be necessary if this is indicated by the measurement system in response to a center offset. These advantages are particularly valuable at the end of the fitting process,during which, because of the relatively short distances travelled by the fitting tool, the center offset can still be kept within the allowable range of tolerances. Assembly errors resulting from isolated results outside the range of tolerances are, therefore, reliably prevented. reduced cross section in the return line wherein the return flow is reduced with respect to the in-feed to the main valve by a ratio of between 1:5 to 1:20. The preferred ratio is in the range of about 1:10. In its simplest arrangement the, the throttle valve is replaced by a return line with a small cross section in the range indicated. This, however, limits the possibility of adjusting the throttle effect. However, good assembly results have been obtained at a return/feed ratio of about 1:10.

In accordance with another feature of the present invention, the connection of the return line to the work cylinder is opposite that of the main line. Thus, pressure surges arriving in front of the work chamber and surges spreading out in the chamber propagate in the same direction as the return flow. It has been observed that with this arrangement more highly optimized asembly results are achieved.

BRIEF DESCRIPTION OF THE DRAWINGS

These and other objects of the present invention and the various features and details of the operation and construction thereof are hereinafter more fully set forth with reference to the accompanying drawing, wherein.

DETAILED DESCRIPTION OF THE PREFERRED EMBODIMENT

Figure 1:
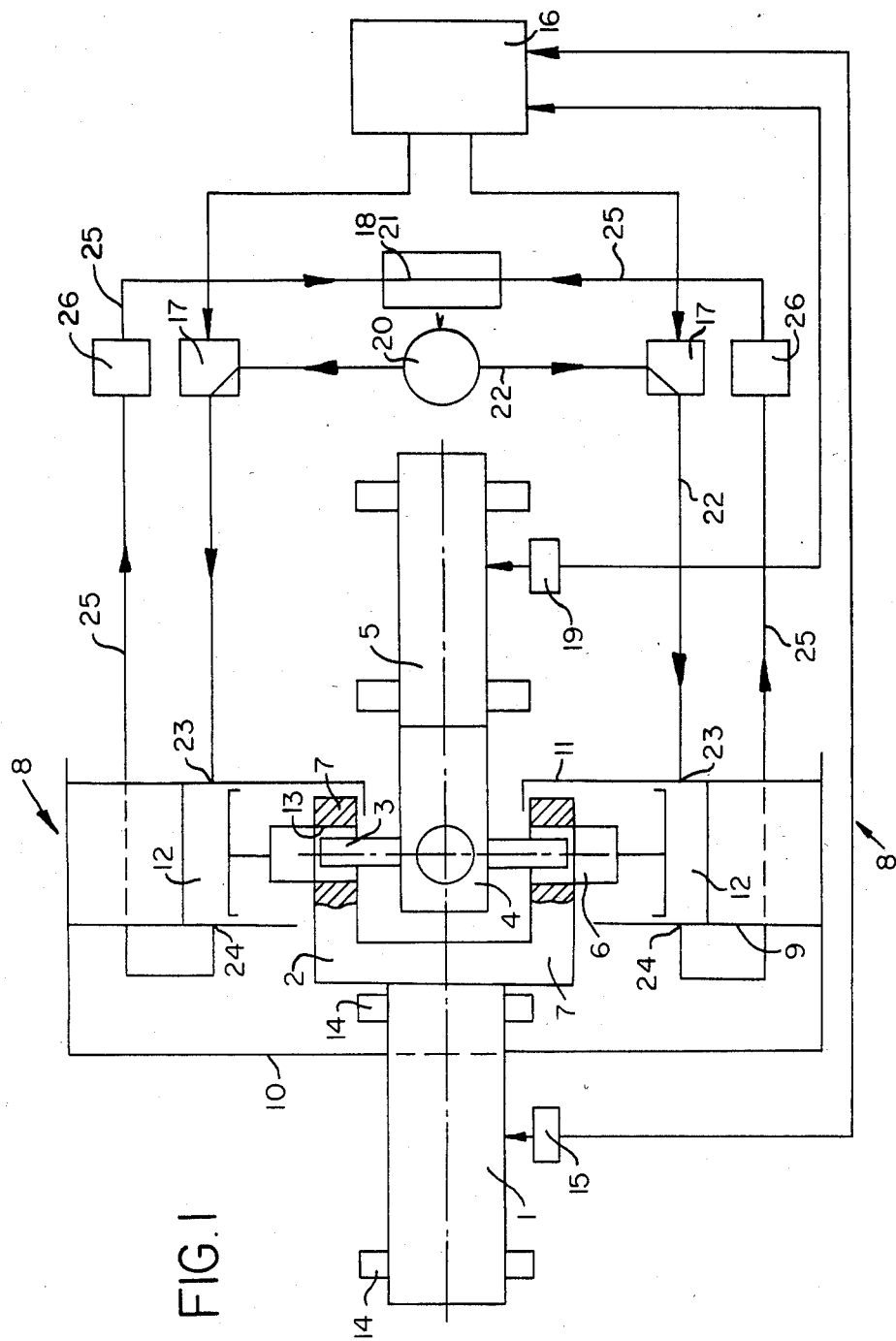
FIG. 1 is a schematic diagram showing the flow control system of the present invention.

For purposes of describing the pressure control system for assembling a bearing and a universal joint assembly or the like, the joint assemby and assembly apparatus are shown schematically and comprise a joint fork 2 connected to a shaft 1 of a universal joint cross 3, which is illustrated as already being connected to another joint fork 4 with a shaft 5 or which is being temporarily centered in fork 2 so that the assembly steps described below can be executed. The arrangement illustrated serves not only to press in and fit bearing 6 but also to correct the pressing or fitting tools relative to one another to prevent the centers of joint parts 2, 3 and 4 from being offset with respect to each other.

The assembling device and system as illustrated comprise essentially two opposing work cylinders 8, each assigned to a fork arm 7. The housings 9 of each of these cylinders are mounted on a machine stand 10 with freedom to move in the pressing direction and, as illustrated, are provided with hook-shaped support elements 11, which grip around behind the free ends of the fork arms 7. By this arrangement, the pressing or fitting force generated in work chamber 12 functions to fix bearings 6 in the bearing bores 13 in the fork arms 7 in a reactionless manner. It has been found that as a result of production tolerances, bearings 6 and bearing bores 13 have different press-fits in the two fork arms 7. Thus, the fork arms are spread to differing degrees. Thus, a force resulting from the pressing or fitting forces acts one-sidedly on the entire joint fork 2 and consequently, as a result of insufficient rigidity, both devices 14 for clamping shaft 1 and the shaft itself tend to bend or the joint forks 2 acquire a center offset with respect to their rest position and with respect to the joint cross 3. The center offset is sensed as a bending of shaft 1 by a measurement pickup 15, which converts the offset into an electrical voltage and sends it to an electronic processing circuit 16. The signal is then processed into a control voltage for each of the two main valves 17 and causes an additional amount of pressure medium 18 to be delivered to work chamber 12 of work cylinder 8 to move bearing 6 in fork arm 7. This shift guides joint fork 2 back into its rest position to compensate for the center offset. In order that the positioning of fork arms 7 with respect to each other is not changed and so that it is simple to make corrections in either direction, both work cylinders 8 can be corrected.

When one of the two bearings 6 comes to rest prematurely against joint cross 3, a one-sided force is exerted which produces a center offset and bending of the other joint fork 4 including shaft 5. This center offset is sensed by another measurement pickup 19 and sent to the electronic processing circuit 16 which again produces a correction in the amount of pressure medium 18 sent to the work cylinders 8.

As illustrated in the schematic, work cylinders 8 are supplied from a central pressure generated which obtains its pressure medium 18 from a supply tank 21. The generator provides a high pressure and conveys the medium via main lines 22 and main valve 17 to work chambers 12 of work cylinders 8. Work cylinders 8 are provided with a return port 24 diametrically opposite the feed port 23, a return line being connected to the return port 24. By this arrangement, returning pressure medium 18 is led via a throttle valve 26 back to supply tank 21. Throttle valve 26 is adjusted to throttle the pressure medium by a ratio of 1:10 with respect to the main line 22. The system, therefore, produces a continuous circulation of pressure medium 12 since main valve 17 is always open a slight amount. In this open base position, the further opening of main valve 17 in response, for example, to the measurement pickup 15, 19 and the electronic processing circuit 16 produces delivery of additional pressure medium to work chamber 12 since throttle valve 26 cannot convey this additional amount simultaneously back through return line 25. By reason of this arranement, highly sensitive pressing in and fitting results can be achieved and the centers of-joint parts 2, 3, 4 are prevented from acquiring an offset with respect to each other throughout the entire process of pressing or fitting bearing 6 into place.

What is claimed is:

1. Apparatus for assembling universal joints consisting of joint fork (2) connected to the shaft (1) of a universal joint cross (3) which is connected to another joint cross (4) and shaft (5) by bearings (6), comprising:
   a frame;
   positioning means (4) attached to the frame for aligning the centers of joint parts (2, 3 and 4);
   hydraulic actuators having a work chamber (12) and cylinder (8) reciprocally mounted therein for pressing said bearings into the fork arms (7);
   a pressure generator (20) with a constant pressure and supply tank (21) with pressure medium (18);
   a main line (22) connecting the actuators to said pressure generator;
   a main valve (17) in said main line for controlling flow of pressure medium (18) to the actuators;
   a measurement system (15, 16 and 19) for controlling said main valve (17) as a function of measurement value;
   means for allowing simultaneous fluid flow into and out of the work chamber to provide a continuous fluid circuit, including a separate return line (25) between the work chamber (12) of the work cylinder (8) and supply tank (21) and means to control the amount of medium delivered to the work chamber including a throttle valve (26) therein which sharply reduces the return flow of pressure medium (18) compared to flow of pressure medium into the work chamber, whereby center offset of one joint part relative to another is eliminated.

2. A device according to claim 1, characterized in that the throttle device is formed by a reduced cross section in the return line (25).

3. A device according to claim 1, characterized in that the return is throttled with respect to the feed by a ratio of between 1:5 to 1:20.

4. A device according to claim 3, characterized in that the ratio is 1:10.

5. A device according to claim 1, characterized in that the connection (24) of the return line (25) is provided on the work cylinder (8) opposite the main line (22).

* * * * *